US012572401B2

(12) United States Patent (10) Patent No.: US 12,572,401 B2
Atur et al. (45) Date of Patent: Mar. 10, 2026

(54) PREDICTIVELY ADDRESSING HARDWARE COMPONENT FAILURES

(71) Applicant: Rakuten Symphony, Inc., Tokyo (JP)

(72) Inventors: Sree Nandan Atur, Newark, CA (US); Ravi Kumar Alluboyina, Santa Clara, CA (US)

(73) Assignee: Rakuten Symphony, Inc., Tokyo (JP)

( * ) Notice: Subject to any disclaimer, the term of this patent is extended or adjusted under 35 U.S.C. 154(b) by 0 days.

(21) Appl. No.: 18/018,653

(22) PCT Filed: Dec. 19, 2022

(86) PCT No.: PCT/US2022/053373
§ 371 (c)(1),
(2) Date: Jan. 30, 2023

(87) PCT Pub. No.: WO2024/136838
PCT Pub. Date: Jun. 27, 2024

(65) Prior Publication Data
US 2025/0307042 A1 Oct. 2, 2025

(51) Int. Cl.
*G06F 11/00* (2006.01)
*G06F 11/07* (2006.01)
(52) U.S. Cl.
CPC ........ *G06F 11/008* (2013.01); *G06F 11/0709* (2013.01); *G06F 11/0712* (2013.01); *G06F 11/0793* (2013.01)
(58) Field of Classification Search
CPC .............. G06F 11/008; G06F 11/0709; G06F 11/0712; G06F 11/079; G06F 11/0793
See application file for complete search history.

(56) References Cited

U.S. PATENT DOCUMENTS

| | | | |
|---|---|---|---|
| 7,577,090 | B2 | 8/2009 | Xu |
| 9,300,548 | B2 | 3/2016 | Asthana |
| 9,483,338 | B2 | 11/2016 | Bhalla |
| 9,628,340 | B2 | 4/2017 | Blair |
| 9,645,899 | B1 | 5/2017 | Felstaine |

(Continued)

FOREIGN PATENT DOCUMENTS

| | | |
|---|---|---|
| CN | 107069676 B | 8/2019 |
| WO | WO2017152763 A1 | 9/2017 |

*Primary Examiner* — Joseph R Kudirka
(74) *Attorney, Agent, or Firm* — David R. Stevens; Stevens Law Group

(57) ABSTRACT

The present invention extends to methods, systems, and computer program products for predictively addressing hardware component failures. Network packets can be received over time at a platform. Metrics derived from platform hardware components and derived from one or more workloads utilizing the platform hardware components can be monitored. Model training data can be formulated from the metrics. A health check model can be trained using the model training data. The health check model can be executed to compute a probability that a monitored platform hardware component is on a path to failure. It can be determined that the probability exceeds a threshold. A workload can be relocated from a pod containing the monitored platform hardware component to another pod. Additional network packets can be received over time at the platform. The workload can process data contained in the additional network packets at the other pod.

18 Claims, 5 Drawing Sheets

(56) References Cited

U.S. PATENT DOCUMENTS

| | | | |
|---|---|---|---|
| 9,774,522 | B2 | 9/2017 | Vasseur |
| 10,048,996 | B1 | 8/2018 | Bell |
| 11,212,184 | B2 | 12/2021 | Strom |
| 11,709,741 | B1 * | 7/2023 | Uppal ................. G06F 11/0709 |
| | | | 714/4.11 |
| 2007/0186251 | A1 | 8/2007 | Horowitz |
| 2011/0191462 | A1 | 8/2011 | Smith |
| 2021/0096893 | A1 | 4/2021 | Kottomtharayil et al. |
| 2021/0320936 | A1 | 10/2021 | Wright et al. |
| 2022/0012112 | A1 * | 1/2022 | Wouhaybi ........... G06F 11/3447 |

* cited by examiner

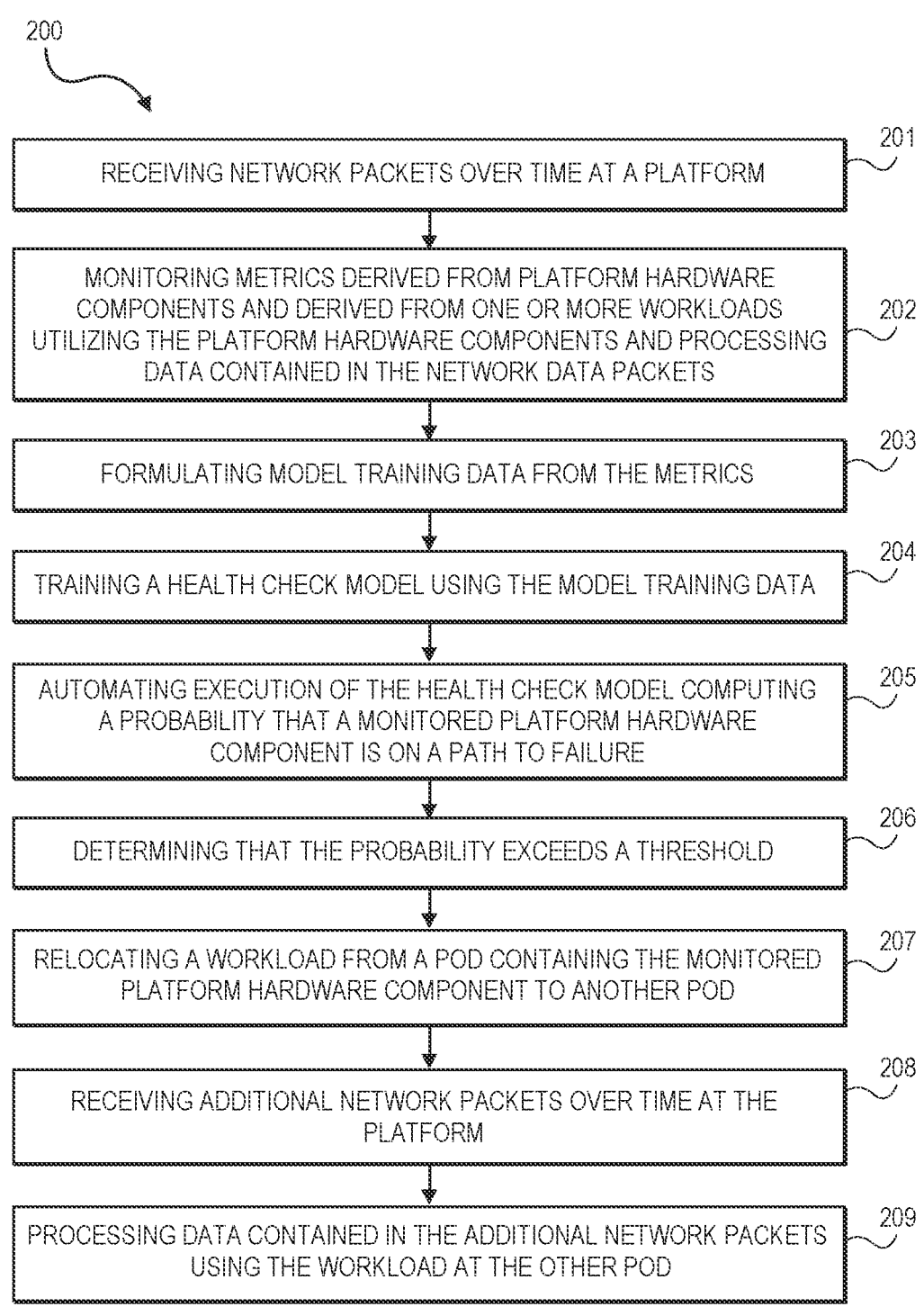

200

RECEIVING NETWORK PACKETS OVER TIME AT A PLATFORM　　201

MONITORING METRICS DERIVED FROM PLATFORM HARDWARE
COMPONENTS AND DERIVED FROM ONE OR MORE WORKLOADS
UTILIZING THE PLATFORM HARDWARE COMPONENTS AND PROCESSING
DATA CONTAINED IN THE NETWORK DATA PACKETS　　202

FORMULATING MODEL TRAINING DATA FROM THE METRICS　　203

TRAINING A HEALTH CHECK MODEL USING THE MODEL TRAINING DATA　　204

AUTOMATING EXECUTION OF THE HEALTH CHECK MODEL COMPUTING
A PROBABILITY THAT A MONITORED PLATFORM HARDWARE
COMPONENT IS ON A PATH TO FAILURE　　205

DETERMINING THAT THE PROBABILITY EXCEEDS A THRESHOLD　　206

RELOCATING A WORKLOAD FROM A POD CONTAINING THE MONITORED
PLATFORM HARDWARE COMPONENT TO ANOTHER POD　　207

RECEIVING ADDITIONAL NETWORK PACKETS OVER TIME AT THE
PLATFORM　　208

PROCESSING DATA CONTAINED IN THE ADDITIONAL NETWORK PACKETS
USING THE WORKLOAD AT THE OTHER POD　　209

FIG. 2

PREDICTIVELY ADDRESSING HARDWARE COMPONENT FAILURES

CROSS-REFERENCE TO RELATED APPLICATIONS

Not applicable.

BACKGROUND

1. Field of the Invention

This invention relates generally to the field of computing, and, more particularly, to predictively addressing hardware component failures.

2. Related Art

Data intensive and network intensive software running on a (e.g., Kubernetes) network cluster can be affined to resources, including hardware components, respecting a Non-Uniform Memory Access (NUMA) boundary. From time to time, hardware components can fail. When a hardware component fails, power may need to be cycled to restart/reset the hardware component. If a failed hardware component fails to properly restart/reset, the hardware component may need to be replaced. A failed hardware component can (potentially significantly) degrade network cluster operations for a period time. The period of time can vary depending at least in part on if the hardware component can be restarted/reset or if the hardware component has to be replaced. Depending on the hardware components a restart/reset can take anywhere from seconds to minutes.

Typically, when a hardware component fails, the failure also has an adverse impact on any software utilizing the hardware component. For example, software effectiveness can (potentially significantly) degrade or the software may also fail. In response to software degradation, a user may also choose to stop and restart the software using an alternate compatible hardware component.

After software fails or is stopped, a restart process can be initiated to restart the software. Depending on the software, a restart can take anywhere from seconds to minutes. During a restart, software is typically not available for use. Thus, software downtime occurs whenever software fails, is stopped, or is in the processes of being restarted. Software downtime negatively impacts productivity and downtime for one software can propagate problems to other software. For example, operating system (OS) downtime can negatively impact applications relying on the operating system for services.

Some systems include monitoring components that monitor hardware resources. The monitoring components can monitor hardware component failures and take a recovery action after a failure is detected. Monitoring components can used threshold-based approaches. However, threshold-based approaches may not detect hardware failures that occur quickly. Monitoring components can generate alerts notifying users of issues. However, manually intervention is typically required to fix the issues (e.g., reset/restart hardware, replace hardware, relocate software, restart software, etc.).

BRIEF DESCRIPTION OF THE DRAWINGS

The specific features, aspects and advantages of the present invention will become better understood with regard to the following description and accompanying drawings where:

FIG. 2 illustrates a flow chart of an example method for predictively addressing hardware component failures.

DETAILED DESCRIPTION

Figure 1A:
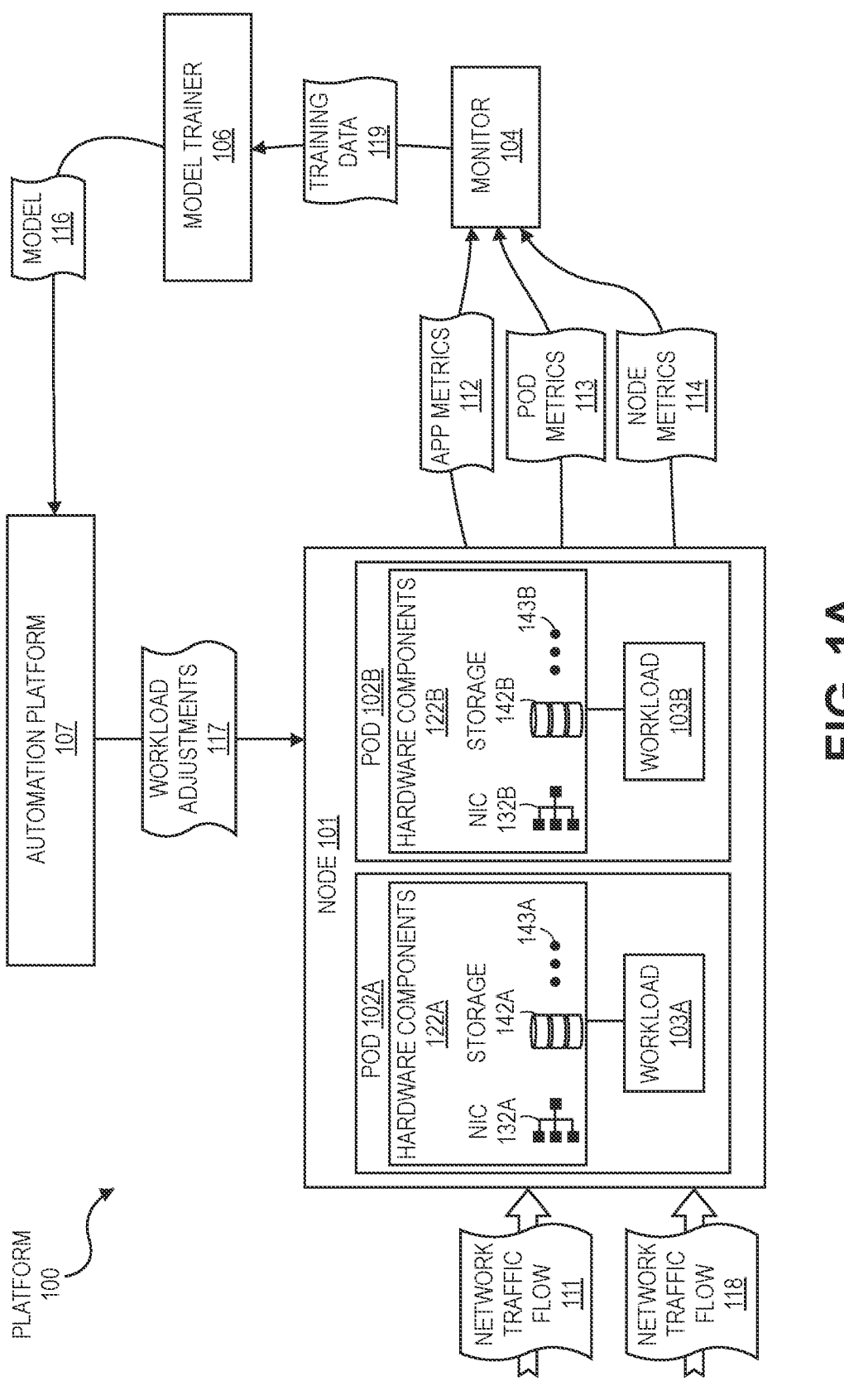
FIG. 1A illustrates an example platform architecture that facilitates predictively addressing hardware component failures.

The present invention extends to methods, systems, and computer program products for predictively addressing hardware component failures.

Aspects of the invention can predict (with a certain level of probability) that a hardware component is on a path to failure. Remediating actions can be taken in response to a predicted hardware component failure. Remediating a predicted hardware component failure minimizes (and potentially eliminates) downtime relative to responding after an actual hardware component failure.

Remediating actions can include moving workloads off a predicted failing hardware component to another compatible hardware component. Workloads can be moved between pods at the same node or between pods at different nodes.

A hardware component predicted to fail can be monitored. It may be that a hardware component predicted to fail recovers and returns to appropriate operation. When a hardware component recovers, workloads can be moved back to the hardware component.

In one aspect, a Recurrent Neural Network (RNN), such as, a Long Short-Term Memory (LSTM) model, can be used to predict hardware component failure or a probability (e.g., percentage chance) of hardware component failure. Predicting hardware component failure or a probability thereof can be based on how workloads are processing data contained in network packets including any hardware/software errors monitored during processing.

In this description and the following claims, a "processing unit" is defined as electronic circuitry that executes instructions of a computer program. A processing unit can be a central processing unit (CPU), a Graphical Processing Units (GPUs), a general-purpose GPUs (GPGPUs), a Field Programmable Gate Arrays (FPGA), an application specific integrated circuits (ASICs), a Tensor Processing Units (TPUs), etc. Processing unit is also defined to include a core of a multi-core processor.

In this description and the following claims, a "multi-core processor" is defined as a microprocessor on a single integrated circuit with two or more separate processing units, called cores, each of which reads and executes program instructions. The instructions are ordinary CPU instructions (such as add, move data, and branch) but the single processor can run instructions on separate cores at the same time, increasing overall speed for programs that support multithreading or other parallel computing techniques.

In this description and the following claims, a "pod" is defined as an abstraction that represents a group of shared resources (e.g., processor, storage, memory, networking, etc.) and one or more applications.

In this description and the following claims, a "node" is defined as a worker machine and can be a virtual machine or a physical machine. A node can include multiple pods.

In this description and the following claims, "Non-Uniform Memory Access (NUMA)" is a computer memory design used in multiprocessing where memory access time depends on memory location relative to a processor. Under NUMA, a processor can access its own local memory and storage faster than non-local memory and storage (i.e., memory/storage local to another processor or memory/storage shared between processors). A NUMA architecture can include one or more "nodes" of resources. The resources at a NUMA node can include a plurality of CPUs connected to volatile memory and connected to one or more Non-Volatile Memory Express (NVMe) (or other) storage devices.

In this description and the following claims, "hardware component" is defined to include any computer system hardware component including but not limited to: Network Interface Cards (NICs), system memory (e.g., RAM), processing units (including CPUs and FPGAs), storage devices (including solid state drives (SSDs) and hard disk drivers (HDDs), controllers, etc.

In this description and the following claims, a "workload" is defined as a software program running on and/or utilizing one or more hardware components. Workloads can include applications, processes, services, micro-services, network services, daemons, operating systems, etc.

FIG. 1 illustrates an example platform architecture 100 that facilitates predictively addressing hardware component failures. As depicted, platform architecture 100 includes node 101, monitor 104, model trainer 106, and automation platform 107. Node 101 further includes pods 102A and 102B (and may also include one or more additional pods). Pod 102A includes hardware components 122A and workload 103A. Hardware components 122A includes NIC 132A, storage 142A, and one or more additional hardware components 143A. Pod 102B includes hardware components 122B and workload 103B. Hardware components 122B includes NIC 132B, storage 142B, and one or more additional hardware components 143B. It may be that node 101 is a NUMA node.

In general, node 101 can receive a plurality of network packets over time defining an existing network traffic flow. Workloads at node 101 can utilize corresponding hardware resources. For example, workload 103A can utilize any of NIC 132A, storage 142A, and one or more additional hardware components 143A. Similarly, workload 103B can utilize any of NIC 132B, storage 142B, and one or more additional hardware components 143B. Workloads 103A, 103B can process data contained in the network packets.

Over time, monitor 104 can monitor node 101, pods 102A and 102B, hardware components 122A and 122B, and workloads 103A and 103B. Monitor 104 can collect metrics associated with any of: node 101, pods 102A and 102B, hardware components 122A and 122B, and workloads 103A and 103B during processing of data contained in network packets by any of: workloads 103A and 103B. Monitor 104 can derive training data from the collected metrics. The derived training data can be used to train health check models. Monitor 104 can send the derived training data to model trainer 106.

Model trainer 106 can receive training data from monitor 104. Model trainer 106 can train workload adjustment models using the training data. Health check models can be RNNs such at LSTM models. Model trainer 106 can send health check models to automation platform 107. A health check model can be configured to predict hardware component failure and/or predict a probability (e.g., percentage chance) of hardware component failure.

Automation platform 107 can receive health check models from model trainer 106. Automation platform 107 can execute a health check model to predict hardware component failure and/or predict a probability of hardware component failure. Based on predicted hardware component failure and/or a probability thereof, automation platform 107 can send workload adjustments to node 101. The workload adjustments can include instructions to relocate workloads from one pod to another pod. Workload adjustments can include relocating a workload from one pod to another pod at the same node or from a pod at one node to a pod at another node.

Node 101 can receive workload adjustments from automation platform 107. Node 101 can adjust workloads between any of pod 102A, pod 102B, other pods of node 101, or pods at other node in accordance with instructions included in received workload adjustments. Adjusting workloads can include moving workloads away from hardware components predicted to be on a path to failure or hardware components that have a probability of predicted failure exceeding a threshold (e.g., numerical or percentage). Adjusting workloads can include moving workloads to appropriately operating hardware components.

FIG. 2 illustrates a flow chart of an example method 200 for predictively addressing hardware component failures. Method 200 will be described with respect to the components and data in platform architecture 100.

Method 200 includes receiving network packets over time at a platform (201). For example, node 101 can receive a plurality of network packets over time defining network traffic flow 111. Workloads at node 101 can run on and/or utilize corresponding hardware components and can process data contain in the network packets of network traffic data flow 111. For example, workload 103A can run on and/or utilize any of hardware components 122A. Similarly, workload 103B can run on and/or utilize any of hardware components 122B to process data contained in the network packets of network traffic data flow 111.

Method 200 includes monitoring metrics derived from platform hardware components and derived from one or more workloads utilizing the platform hardware components and processing data contained in the network data packets (202). For example, monitor 104 can monitor workload metrics 112, pod metrics 113, and node metrics 114 derived from hardware components 122A and 122B and derived from workloads 103A and 103B executing on and/or utilizing hardware components 122A and 122B respectively to process data contained in network packets of network traffic flow 111. Workload metrics 112 can be metrics corresponding to workloads 103A and 103B. Pod metrics 113 can be metrics corresponding to pods 102A and 102B including hardware components 122A and 122B. Node metrics 114 can be metrics corresponding to node 101 including hardware components 122A and 122B.

In general, failure detections details, software errors, and/or hardware errors, including errors for disk, NIC, memory, etc. can be added into metrics and/or reports. Monitor 104 can monitor a variety of errors including cyclic redundancy check (CRC) errors, error correction code (ECC) errors, and catastrophic errors (CATERR) not related to software, thermal trip detection, etc. In some aspects, different types of errors are monitored for different types of hardware components. For example, monitor 104 can monitor CRC errors for HDDs, NICs, and FPGAs. Monitor 104 can monitor ECC errors for system memory. Monitor 104 can monitor CATERR and thermal trip detection for CPUs. Any of CRC errors, ECC errors, CATERS, thermal trip detections etc. can be included any of workload metrics 112, pod metrics 113, and node metrics 114.

Method 200 includes formulating model training data from the metrics (203). For example, monitor 104 can formulate training data 119 from workload metrics 112, pod metrics 113, and node metrics 114. Monitor 104 can send training data 119 to model trainer 106. Model trainer 106 can receive training data 119 from monitor 104. Method 200 includes training a health check model using the model training data (204). For example, model trainer 106 can train model 116 using training data 119. Model 116 can be an RNN, such as, as an LSTM model, configured to predict hardware component failure and/or predict a probability (e.g., percentage chance) of hardware component failure. Model trainer 106 can send model 116 to automation platform 107. Automation platform 107 can receive model 116 from model trainer 106.

Method 200 includes automating execution of the health check model computing a probability that a monitored platform hardware component is on a path to failure (205). For example, automation platform 107 can automate execution of model 116. Executing model 116 can predict a hardware component failure and/or predict a probability (e.g., percentage chance) of hardware component failure, from among hardware components 122A and 122B.

Method 200 includes determining that the probability exceeds a threshold (206). For example, automation platform 107 can determine that a probability of failure for a hardware component included hardware components 122A or 122B exceeds a (e.g., numerical or percentage) threshold.

Method 200 includes relocating a workload from a pod containing the monitored hardware component to another pod (207). For example, based on the failure probability exceeding the threshold, automation platform 107 can send workload adjustments 117 to node 101. Node 101 can adjust workloads within platform 100, within node 101, withing any of pods 102A, 102B in accordance with workload adjustments 117. Workloads can be adjusted (e.g., from one pod to another pod at the same node or from a pod at one node to a pod at another node) in anticipation of and prior to a hardware component failure. Adjusting workloads prior to hardware component failure minimizes (and potentially eliminates) workload downtime. A workload can be moved from running on and/or utilizing a hardware component anticipated to fail to running on and/or utilizing a compatible appropriately functioning hardware component.

Method 200 includes receiving additional network packets over time at the platform (208). For example, subsequent to receiving network packets defining network traffic flow 111, node 101 can receive additional network packets defining network traffic flow 118. Method 200 includes processing data contained in the additional network packets using the workload at the other pod (209). For example, an adjusted workload (now running on and/or utilizing a compatible appropriately functioning hardware component) can process data contained in network packets of network traffic flow 118.

Method 200 or portions thereof can be repeated responsive to processing data packets in network traffic flow 118 to further refine a health check model configured to adjust workloads at platform architecture 100. Method 200 or portions thereof can also be implemented in environments spanning multiple nodes, where metrics are gathered from the multiple nodes and utilized to train a predictive model. Implementations can also include combinations of repeating method 200 or portions thereon in environments spanning multiple nodes.

Figure 1B:
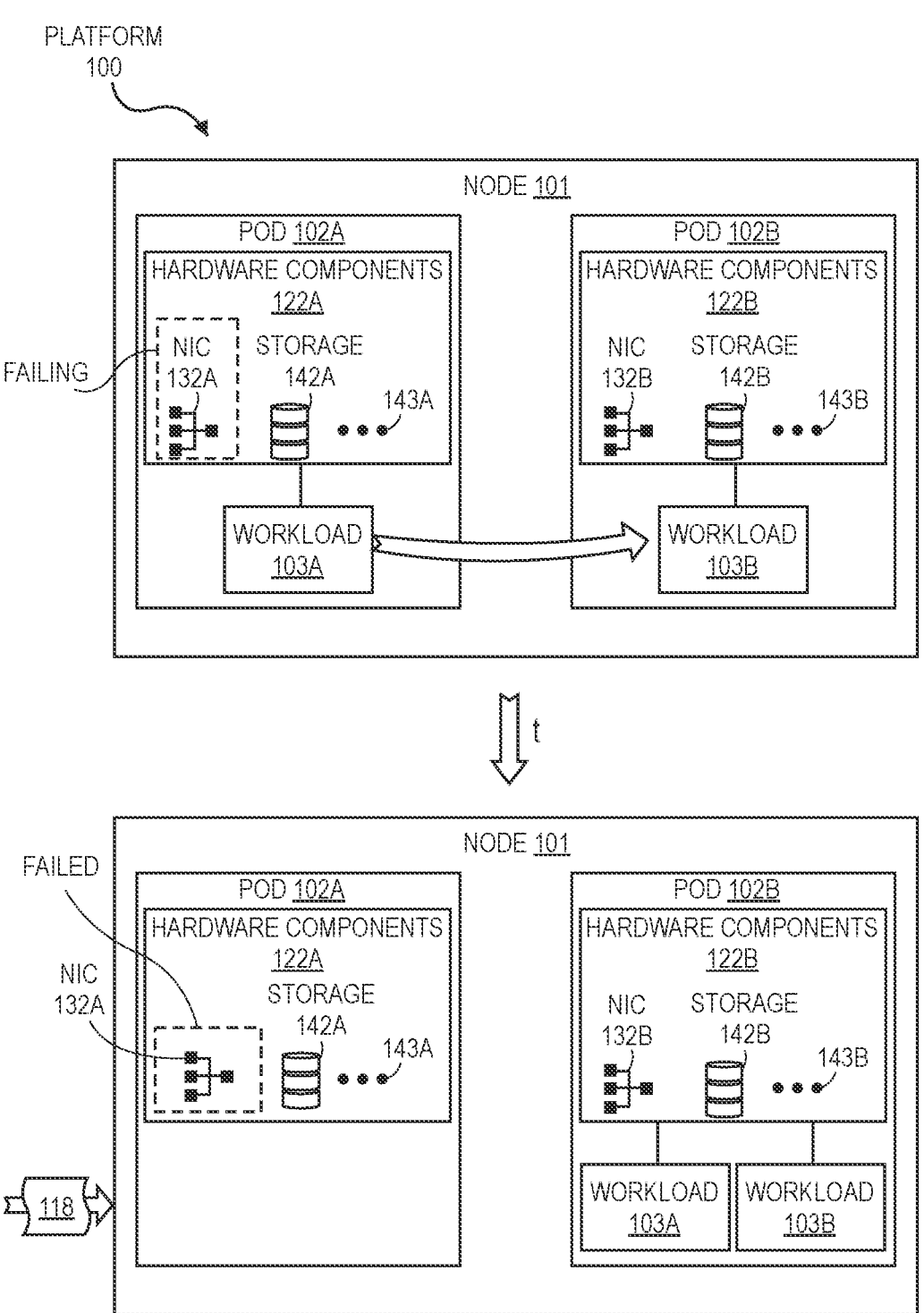
FIG. 1B illustrates an example of moving a workload between pods at a node.

FIG. 1B illustrates an example of moving a workload between pods at a node. Automation platform 107 can execute model 116 and determine that the probability of NIC 132A failing exceeds a threshold. In anticipation of NIC 132A failing, automation platform 107 can include an instruction in workload adjustments 117 to move workload 103A from pod 102A to pod 102B. Automation platform 107 can send workload adjustments 117 to node 101.

After receiving workload adjustments 117, node 101 can move workload 103A from pod 102A to pod 102B. Node 101 can also cordon pod 102A. Workload 103A can then use hardware components 122B, including NIC 132B (a compatible appropriately functioning hardware component), to process data contained in network packets of network traffic flow 118. Moving workload 103A prior to NIC 132A failing can minimize (and potentially eliminate) downtime associated with workload 103A relative to restarting workload 103A after NIC 132A fails.

Figure 1C:
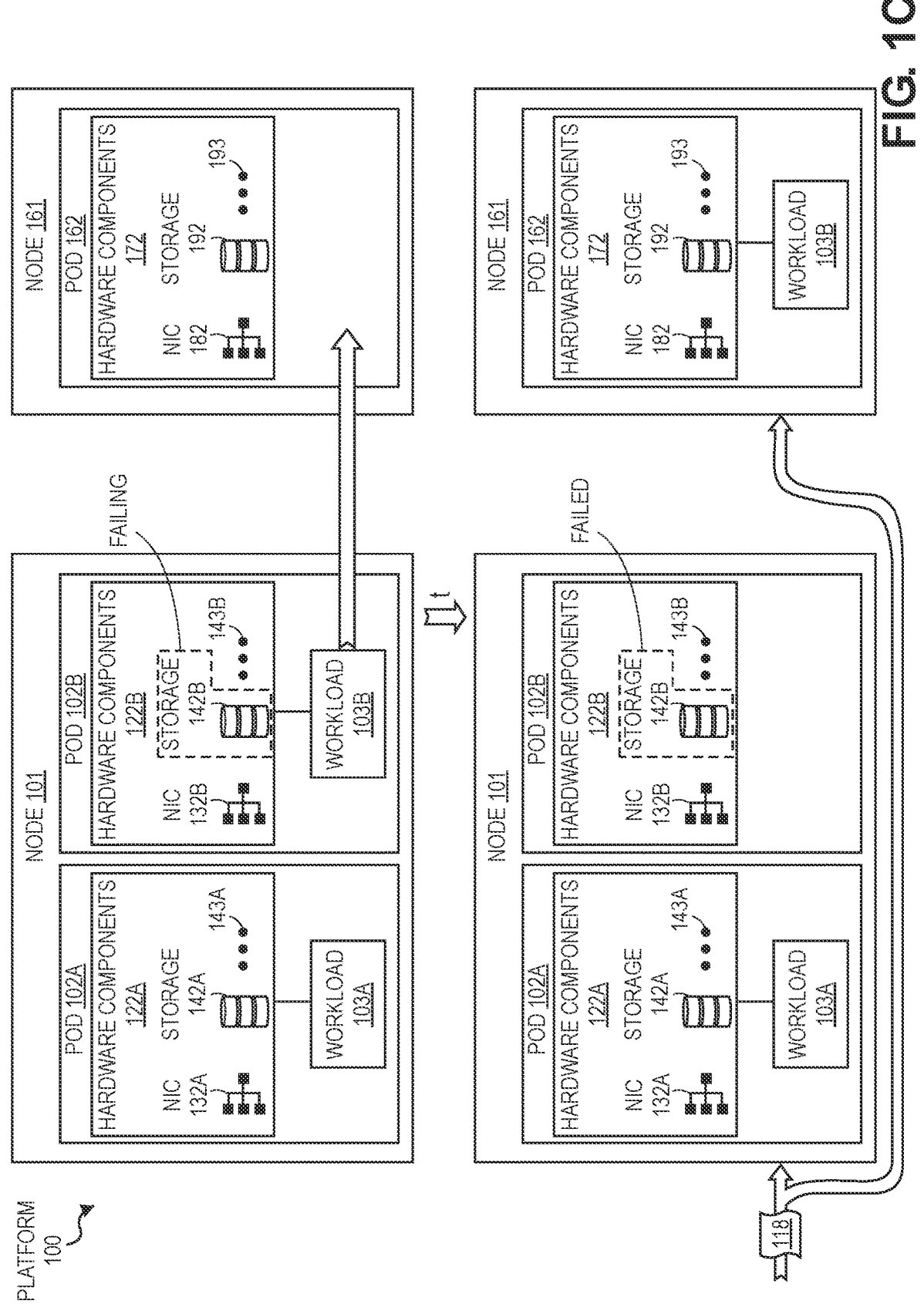
FIG. 1C illustrates an example of moving a workload between pods at different nodes.

FIG. 1C illustrates an example of moving a workload between pods at different nodes. As depicted in FIG. 1C, node 161 includes pod 162. Pod 162 includes hardware components 172 including NIC 182, storage 192, and one or more other hardware components 193. It may be that node 161 is a NUMA node.

Still referring to FIG. 1C, automation platform 107 can execute model 116 and determine that the probability storage 142B failing exceeds a threshold. In anticipation of storage 142A failing, automation platform 107 can include an instruction in workload adjustments 117 to move workload 103B from pod 102B to pod 162 at node 161. Automation platform 107 can send workload adjustments 117 to node 101 and/or node 161.

After receiving workload adjustments 117, node 101 and/or node 161 can move workload 103B from pod 102B to pod 162. Node 101 can also cordon pod 102B. Workload 103B can then use hardware components 172, including storage 192 (a compatible appropriately functioning hardware component), to process data contained in network packets of network traffic flow 118. Moving workload 103B prior to storage 142B failing can minimize (and potentially eliminate) downtime associated with workload 103B relative to restarting workload 103B after storage 142B fails.

Moving workload 103B can include activities at node 101 and at node 161. State for workload 103B can be backed up from pod 102B. Workload 103B can be deleted from pod 102B. Pod 162 can be selected as a destination pod. The backed-up state can be imported to pod 162. Workload 103B can be restored at pod 162

FIGS. 1B and 1C describe examples of workload adjustments that automation platform 107 can implement when relocating a workload (207).

Figure 3:
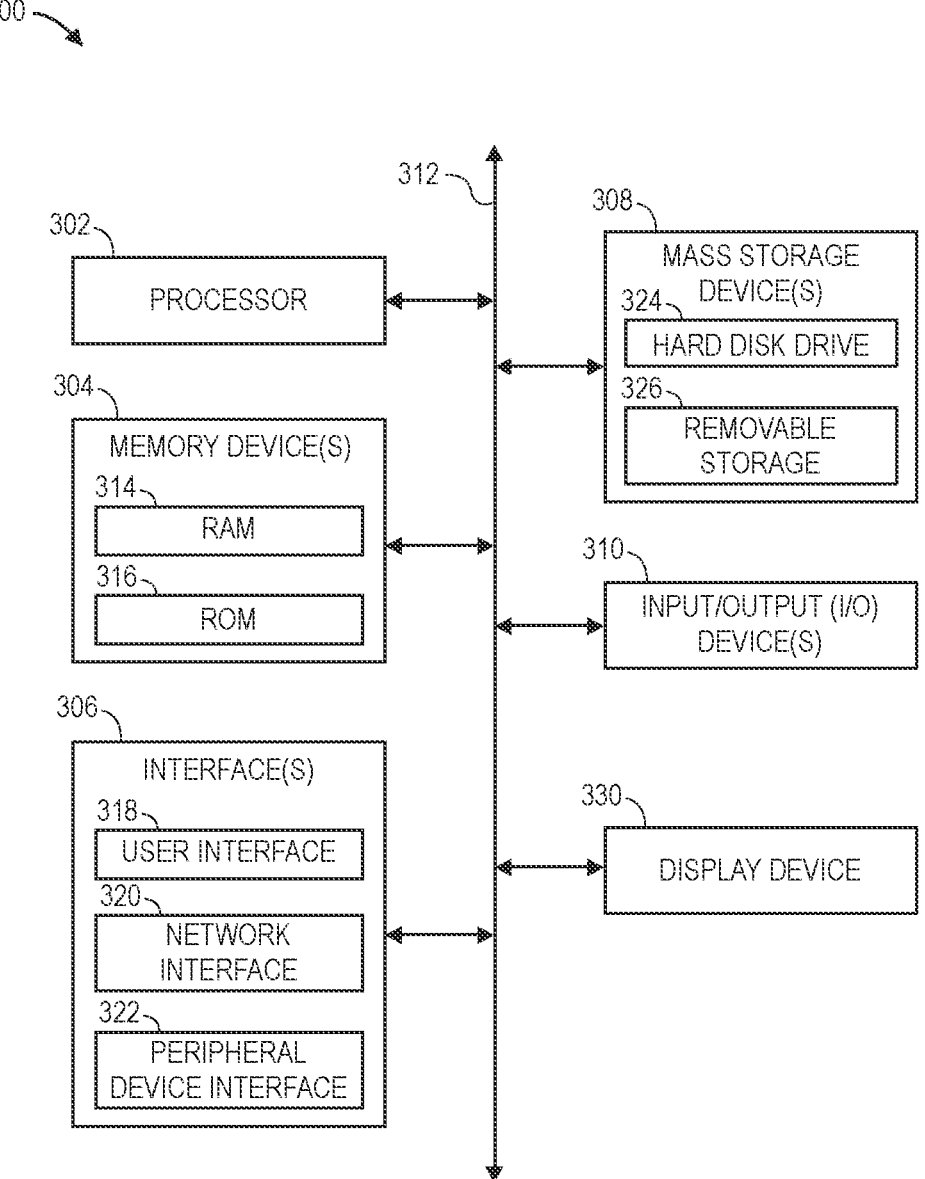
FIG. 3 illustrates an example block diagram of a computing device.

FIG. 3 illustrates an example block diagram of a computing device 300. Computing device 300 can be used to perform various procedures, such as those discussed herein. Computing device 300 can function as a server, a client, or any other computing entity. Computing device 300 can perform various communication and data transfer functions as described herein and can execute one or more application programs, such as the application programs described herein. Computing device 300 can be any of a wide variety of computing devices, such as a mobile telephone or other mobile device, a desktop computer, a notebook computer, a server computer, a handheld computer, tablet computer and the like.

Computing device 300 includes one or more processor(s) 302, one or more memory device(s) 304, one or more interface(s) 306, one or more mass storage device(s) 308, one or more Input/Output (I/O) device(s) 310, and a display device 330 all of which are coupled to a bus 312. Processor (s) 302 include one or more processors or controllers that execute instructions stored in memory device(s) 304 and/or mass storage device(s) 308. Processor(s) 302 may also include various types of computer storage media, such as cache memory.

Memory device(s) 304 include various computer storage media, such as volatile memory (e.g., random access memory (RAM) 314) and/or nonvolatile memory (e.g., read-only memory (ROM) 316). Memory device(s) 304 may also include rewritable ROM, such as Flash memory.

Mass storage device(s) 308 include various computer storage media, such as magnetic tapes, magnetic disks, optical disks, solid state memory (e.g., Flash memory), and so forth. As depicted in FIG. 3, a particular mass storage device is a hard disk drive 324. Various drives may also be included in mass storage device(s) 308 to enable reading from and/or writing to the various computer readable media. Mass storage device(s) 308 include removable media 326 and/or non-removable media.

I/O device(s) 310 include various devices that allow data and/or other information to be input to or retrieved from computing device 300. Example I/O device(s) 310 include cursor control devices, keyboards, keypads, barcode scanners, microphones, monitors or other display devices, speakers, printers, network interface cards, modems, cameras, lenses, radars, CCDs or other image capture devices, and the like.

Display device 330 includes any type of device capable of displaying information to one or more users of computing device 300. Examples of display device 330 include a monitor, display terminal, video projection device, and the like.

Interface(s) 306 include various interfaces that allow computing device 300 to interact with other systems, devices, or computing environments as well as humans. Example interface(s) 306 can include any number of different network interfaces 320, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 318 and peripheral device interface 322.

Bus 312 allows processor(s) 302, memory device(s) 304, interface(s) 306, mass storage device(s) 308, and I/O device (s) 310 to communicate with one another, as well as other devices or components coupled to bus 312. Bus 312 represents one or more of several types of bus structures, such as a system bus, PCI bus, IEEE 1394 bus, USB bus, and so forth.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can transform information between different formats, such as, for example, network packets, network traffic flows, workload metrics, pod metrics, node metrics, training data, models, workload adjustments, etc.

System memory can be coupled to the one or more processors and can store instructions (e.g., computer-readable instructions, computer-executable instructions, etc.) executed by the one or more processors. The system memory can also be configured to store any of a plurality of other types of data generated by the described components, such as, for example, network packets, network traffic flows, workload metrics, pod metrics, node metrics, training data, models, workload adjustments, etc.

Aspects of the invention can minimize workload downtime by re-locating workloads in anticipation of and prior to hardware component failures. Minimizing workload downtime translates to higher availability and improved customer experience.

Table 1 depicts example times to realize various restart actions after a hardware component failure.

TABLE 1

| Action | Approximate Time Taken |
| --- | --- |
| Restart generic micro-services | <15 s |
| Restart 5G DU | <60 s |
| Restart gNodeB network services | 2-3 minutes |
| k8s daemonset restarts | 2-5 minutes |
| OS reboot | 7 to 10 minutes |
| Hardware (IPMI) restart | 10 to 12 minutes |

Aspects of the invention can be utilized to (potentially significantly) reduce or even eliminate the indicated restart times by re-locating workloads associated with the indicated actions in anticipation of and prior to hard component failures.

It may be that a failed hardware component is later brought (e.g., back) into an appropriate operational state, either on its own (e.g., by implementing internal recovery algorithms) and/or through manual intervention. It may also be that hardware component anticipated to fail does in actually fail and transitions back to indicating an appropriate operational state. For example, some other anomaly may make the hardware component appear as if it is to fail but it doesn't. When a hardware component transitions from failed or anticipated to fail back to operation, workloads can be moved (e.g., back) onto the hardware components.

For example, it may be that NIC 132A transitions back to an appropriate operational state. Subsequent to NIC 132A transitioning an appropriate operational state, automation platform can 107 send workload adjustments to move workload 103A back to pod 102A. Node 101 can then move workload 103A (back) to pod 102A.

Similarly, it may be that storage 142B transitions back to an appropriate operational state. Subsequent to storage 142A transitioning an appropriate operational state, automation platform 107 can send workload adjustments to move workload 103B back to pod 102B. Node 101 and/or node 161 can then move workload 10BA (back) to pod 102B. Node 161 and/or pod 162 may also be shut down, for example, when no other workloads are utilizing hard components 172.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations can comprise or utilize a special purpose or general-purpose computer including computer hardware, such as, for example, one or more computer and/or hardware processors (including any of Central Processing Units (CPUs), and/or Graphical Processing Units (GPUs), general-purpose GPUs (GPGPUs), Field Programmable Gate Arrays (FPGAs), application specific integrated circuits (ASICs), Tensor Processing Units (TPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash or other vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications, variations, and combinations are possible in light of the above teaching. Further, it should be noted that any or all of the aforementioned alternate implementations may be used in any combination desired to form additional hybrid implementations of the disclosure.

What is claimed:

1. A computer implemented method comprising:
receiving network packets over time at a platform;
monitoring metrics derived from platform hardware components and derived from one or more workloads utilizing the platform hardware components and processing data contained in the network packets;

formulating model training data from the metrics;

training a health check model using the model training data;

automating execution of the health check model computing a probability that a monitored platform hardware component is on a path to failure;

determining that the probability exceeds a threshold;

relocating a workload from a pod containing the monitored platform hardware component to another pod;

receiving additional network packets over time at the platform; and processing data contained in the additional network packets using the workload at the other pod.

2. The method of claim 1, wherein training the health check model comprises training a Recurrent Neural Network (RNN).

3. The method of claim 1, wherein training the health check model comprises training a Long Short-Term Memory (LSTM) model.

4. The method of claim 1, wherein computing the probability that the monitored platform hardware component is on the path to failure comprises detecting a probability that a network interface card is on a path to failure.

5. The method of claim 1, wherein computing the probability that the monitored platform hardware component is on the path to failure comprises detecting a probability that a storage device is on a path to failure.

6. The method of claim 1, wherein computing the probability that the monitored platform hardware component is on the path to failure comprises detecting a probability that one of: a processor unit, system memory or a field programmable gate array (FPGA) is on a path to failure.

7. The method of claim 1, wherein relocating the workload to the other pod comprises relocating the workload from one pod at a node to another pod at the node.

8. The method of claim 1, wherein relocating the workload to the other pod comprises relocating the workload from a pod at a current node to another pod at a destination node.

9. The method of claim 8, wherein relocating the workload from the pod at the current node to the other pod at the destination node comprises:

backing up a workload state of the workload from the pod at the current node;

deleting the workload from the pod at the current node;

selecting a destination pod;

importing the workload state to the destination pod; and restoring the workload at the destination pod.

10. A computer system comprising:

a processor; and system memory coupled to the processor and storing instructions configured to cause the processor to:

receive network packets over time at a platform;

monitor metrics derived from platform hardware components and derived from one or more workloads utilizing the platform hardware components and processing data contained in the network packets;

formulate model training data from the metrics;

train a health check model using the model training data;

automate execution of the health check model computing a probability that a monitored platform hardware component is on a path to failure;

determine that the probability exceeds a threshold;

relocate a workload from a pod containing the monitored platform hardware component to another pod;

receive additional network packets over time at the platform; and process data contained in the additional network packets using the workload at the other pod.

11. The computer system of claim 10, wherein the instructions configured to train the health check model comprise instructions configured to train a Recurrent Neural Network (RNN).

12. The computer system of claim 10, wherein the instructions configured to train the health check model comprise instructions configured to train a Long Short-Term Memory (LSTM) model.

13. The computer system of claim 10, wherein the instructions configured to compute the probability that the monitored platform hardware component is on the path to failure comprise instructions configured to detect a probability that a network interface card is on a path to failure.

14. The computer system of claim 10, wherein the instructions configured to compute the probability that the monitored platform hardware component is on the path to failure comprise instructions configured to detect a probability that a storage device is on a path to failure.

15. The computer system of claim 10, wherein the instructions configured to compute the probability that the monitored platform hardware component is on the path to failure comprise instructions configured to detect a probability that one of: a processor unit, a system memory, or a field programmable gate array (FPGA) is on a path to failure.

16. The computer system of claim 10, wherein the instructions configured to relocate the workload to the other pod comprise instructions configured to relocate the workload from one pod at a node to another pod at the node.

17. The computer system of claim 10, wherein the instructions configured to relocate the workload to the other pod comprise instructions configured to relocate the workload from a pod at a current node to another pod at a destination node.

18. The computer system of claim 17, wherein the instructions configured to relocate the workload from the pod at the current node to the other pod at the destination node comprise instructions configured to:

back up a workload state of the workload from the pod at the current node;

delete the workload from the pod at the current node;

select a destination pod;

import the workload state to the destination pod; and restore the workload at the destination pod.

* * * * *